Jan. 20, 1970     D. J. GRANT     3,490,235
PASSIVELY REGULATED WATER ELECTROLYSIS ROCKET ENGINE
Filed Sept. 12, 1967
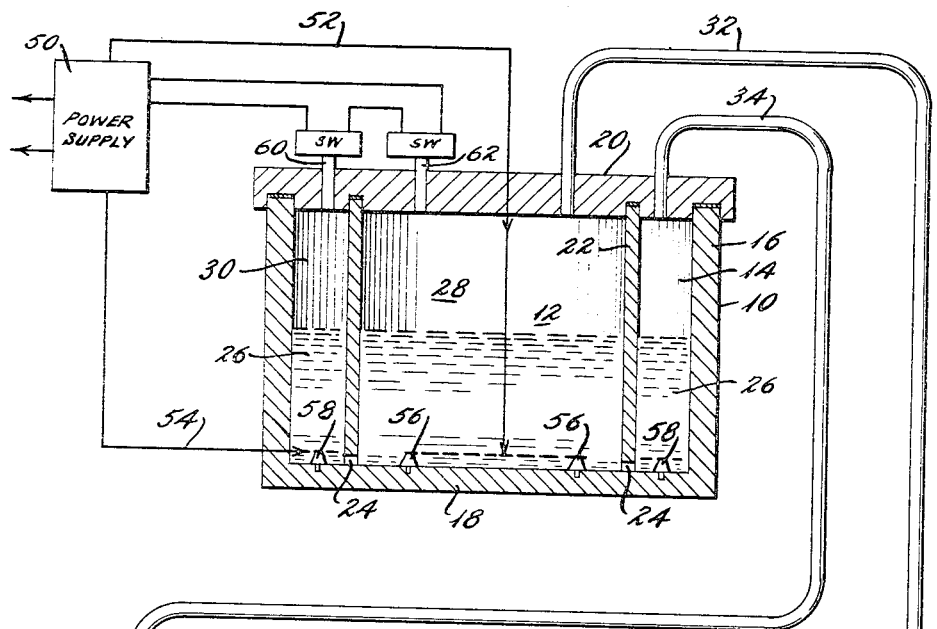
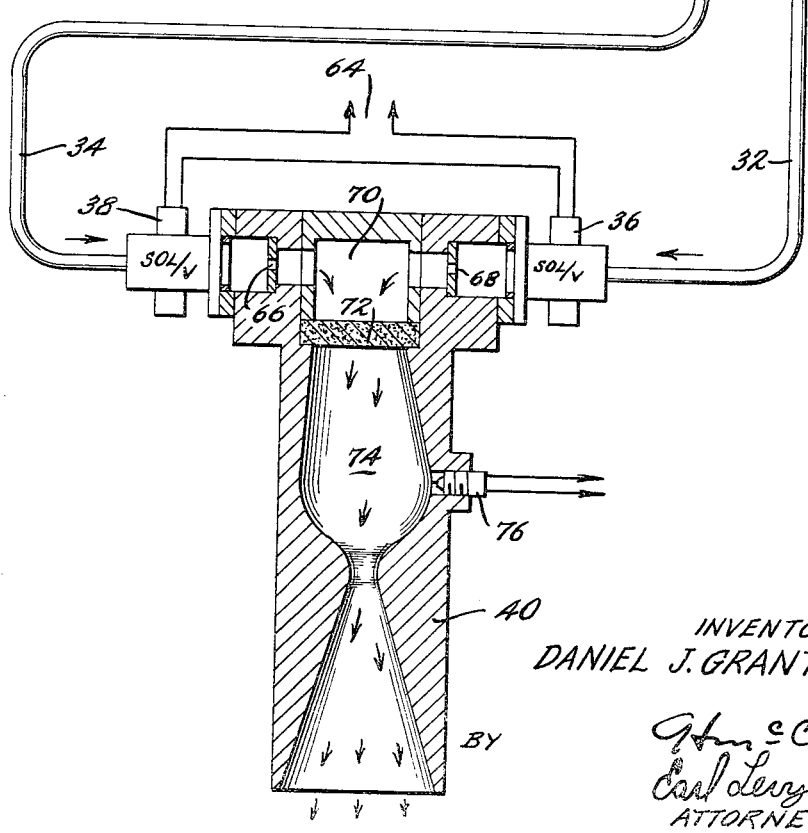
INVENTOR
DANIEL J. GRANT
BY
ATTORNEYS

United States Patent Office 3,490,235
Patented Jan. 20, 1970

3,490,235
PASSIVELY REGULATED WATER ELECTROLYSIS ROCKET ENGINE
Daniel J. Grant, Chevy Chase, Md., assignor to the United States of America as represented by the Administrator of the National Aeronautics and Space Administration
Filed Sept. 12, 1967, Ser. No. 667,637
Int. Cl. F02k 7/08; F02g 3/00; F02b 43/12
U.S. Cl. 60—200                                    4 Claims

ABSTRACT OF THE DISCLOSURE

The invention comprises a water electrolysis rocket characterized by a single vessel storage and water electrolysis system, with the chamber divided into cathode and anode compartments having a volumetric ratio of 1.075:1. The compartments are vented to each other at a point below the electrolyte level. The oxygen and hydrogen lines feed the gases through properly proportioned fixed plate orifices to the mixing chamber of a rocket engine in stoichiometric proportions. The geometry of the system makes it passively self-regulating.

---

The invention described herein was made by employees of the United States Government and may be manufactured and used by or for the Government for governmental purposes without payment of any royalties thereon or therefor.

This invention relates to a water electrolysis system adapted for space conditions and to employment of the gaseous hydrogen and oxygen electrolysis products for propellant purposes.

Orbiting space craft, no matter how perfectly launched, have need for minor orbital adjustment; e.g. to counteract drift, to correct attitude, etc. Orbital adjustments made from time to time are particularly important for proper operation of a stationary (synchronous and equatorial) satellite e.g. Syncom and Early Bird spacecraft. Natural perturbations tend slowly but inexorably to move the spacecraft out of desired orbital position, absent an adequate orbital control procedure (which may be termed station keeping) which maintains the stationary orbit. Station keeping, then, involves periodic firing of small rocket engines on the space craft upon suitable demand to correct drift, maintain spin stabilization, etc. Consequently, such communication satellites, must contain propellants to fuel the station keeping rocket engines.

Electrolysis of water is a most convenient technique for generating gaseous propellants in space craft since power for electrolysis can be made available by mounting solar cells outside the space craft and, conveniently, water can be maintained in liquid state within the space craft. Within limits, the hydrogen-oxygen products of electrolysis can be stored, then burned on command, to fuel the station keeping rockets. The water electrolysis-rocket system constitutes a reaction control system of high reliability, substantial life-time in orbit, and relatively low weight.

The principal object of the present invention is to provide an electrolytic hydrogen-oxygen generator adapted for space craft propellant purposes.

A further object of this invention is to provide a passively regulated electrolytic hydrogen-oxygen generator system for space craft.

Further objects and the advantage of the present invention will become apparent from the description which follows.

Briefly, the present invention involves a compartmented electrolytic gas generator vessel with separate hydrogen and oxygen off take lines therefrom, leading the gases to the mixing chamber of a rocket engine. An appropriately sized stationary orifice is disposed in each gas line so as to feed stoichiometric proportions of oxygen and hydrogen into the mixing chamber. Automatically controlled valves, e.g. by solenoids, may be commanded when to admit these propellant gases to the mixing chamber. Pressure switches associated with the compartmented electrolytic gas generator and with the power supply turn the power supply off when gas pressure therein attains whatever level has been preselected for storage purposes. When gas pressure drops because of station keeping use, the propellant pressure switches turn on power for electrolysis.

The gas generator itself comprises a cylindrical tank concentrically partitioned by an imperforate cylindrical barrier to provide thereby two concentric compartments. The inner compartment contains the anode and generates oxygen. The outer compartment contains the cathode and generates hydrogen. Vent opening in the barrier at a location beneath the minimum liquid level permits some liquid transfer between compartments, stabilizing fluid levels in both compartments and permits use of a common aqueous electrolyte solution (initially low normality KOH) as the hydrogen-oxygen source.

Importantly, a substantial gas space storage volume is provided in the tank above the electrolyte solution in each compartment. This gas storage space is, of course, the minimum required for initial station keeping propellant needs; but as time passes, with continued intermittent use of the electrolytically generated hydrogen and oxygen for propellant purposes, the gas storage volume increases as the volume of liquid electrolyte decreases.

As shown in the drawing, the tank 10 of the electrolytic gas generator is constructed with a pair of concentric compartments 12 and 14 inside generally cylindrical side wall 16, bottom wall 18 and top wall 20. Internal cylindrical partition 22 serves to form an imperforate barrier between compartments 12, 14 save for several vent openings 24 at the bottom of barrier 22. Vent openings 24 permit back and forth passage of liquid aqueous electrolyte 26 and facilitate efficient electrolysis, while at the same time, above the electrolyte, two gas storage chambers 28 (for the oxygen) and 30 (for the hydrogen) are kept separate and distinct. Vents 24 in partition wall 22 serve to maintain the gas pressures in compartments 12 and 14 equal by virture of free electrolyte passage from compartment 12 to compartment 14.

An oxygen off-take line 32 leads the oxygen stored in chamber 28 to rocket engine assembly 40. Similarly, a hydrogen take-off line 34 leads the hydrogen stored in chamber 30 to engine assembly 40. Normally closed solenoid valves 36 and 38, disposed respectively in oxygen supply line 32 and hydrogen supply line 34, act to seal gas generator tank 10 against loss of either electrolyte or propellant gases.

A power supply 50 electrically connected to solar cells (not shown) on an outside surface of the spacecraft provides direct current via leads 52 and 54 for the electrolysis with lead 52 passing through top wall 20, to anode members 56 and 54, passing through side wall 16 to cathode members 58. The pressure switches 60 and 62 disposed in top wall 20 are also associated with power supply 50; they act to turn on the power for electrolysis when pressure inside gas storage chambers 28 and 30 drops below a predetermined level and to turn off the power whenever the gas pressure attains the predetermined level for gas storage purposes. The upper pressure level is, of course, largely predetermined by the quantity of propellant that must be consumed in engine assembly 40 for any given station keeping orbital correction.

When it becomes necessary to fire rocket engine assembly 40, an appropriate signal is transmitted to the space craft and power lines 64 are energized to open solenoids 36 and 38. Hydrogen then passes from storage chamber 30 through hydrogen supply line 34, past solenoid valve 38 to a fixed orifice plate 66 which meters hydrogen flow into mixing chamber 70. Similarly the oxygen passes from storage chamber 28 through oxygen supply line 32, past solenoid valve 36 to fixed orifice plate 68, which serves to meter oxygen flow into mixing chamber 70. The action of the orifice plates 66 and 68 is to ensure entry of stoichiometric proportions into the mixing chamber 70. The mixed gases pass from mixing chamber 70 through a porous plug 72 (whose purpose is to stabilize the flame front in the combustion chamber 74 of the rocket engine). An electric ignition device 76 (e.g. sparkplug) is provided to fire the propellant gases.

Allusion has already been made that the rationale of the present invention resides in the station keeping need for controlling the orbit of a space craft, particularly of communication satellites. Thus, the above described identification of a top wall 20 and bottom wall 18 presumes that the space craft will be rotated or otherwise operated so as to maintain electrolyte 26 as a liquid body resting on the bottom wall 18 of tank 10. In a typical spin stabilized communication satellite, the small rocket engines provided for axial thrusting in one or more directions and for radial thrusting are operated only for brief periods of time to make whatever station keeping corrections are needed, e.g. orbital position, altitude, etc. This intermittent demand for propellant allows adequate time for electrolysis in tank 10 to generate sufficient gaseous oxygen and hydrogen for propellant purposes from the power supplied by solar cells. In an exemplary instance of a stationary communication satellite, requirements are on the order of 10 lb./sec. total impulse over a 10 second burn time, which requires about 0.03 lb. of gaseous propellants. For such requirements a gas generator may be a cylindrical tank with an internal volume of 1100 cubic inches containing therein 740 cubic inches of 0.4 molar KOH solution (0.60 pound of KOH), the electrolysis generates enough propellant hydrogen and oxygen for station keeping purposes, for about a thirty month period. A power supply of about 2.2 volts, 2.1 amp (declining to 1.7 volts as water disappears) which provides sufficient electrolyzed propellant gases for a 10 lb./sec. impulse (about a 10 second burn time) can be obtained from the satellite solar cells by about 20 hours exposure to sunlight. The operating pressure levels for the on-off pressure switches controlling electrolysis may be a 150 p.s.i.a. for cut-off and about a 75 p.s.i.a. for turning on current.

The present gas generator system has certain advantages for employment as part of an orbiting space craft because a passive regulation arrangement is built thereinto. Mention has already been made how barrier 22 maintains the oxygen and hydrogen storage chambers 28 and 30 separate and discreet, but at the same pressure, and that fixed orifice plates 66 and 68 feed a stoichiometric ratio of the two propellant gases into mixing chamber 70 of rocket assembly 40. This arrangement is passively self-regulating when the oxygen storage chamber 28 and the hydrogen storage chamber 30 are properly sized, one relative to the other. Specifically, compartments 12 and 14 are constructed to provide a hydrogen to oxygen cross sectioned area ratio of about 1.075:1. In like fashion, the hydrogen feed line 74 has cross-section area about 1.075 of that of oxygen feed line 72 (since the gas therein is part of the stored gas). The oxygen and hydrogen orifice plates 66, 68 have a predetermined fixed ratio of area ($A_O$, $A_H$) corresponding generally to the following equation:

$$A_O = 7.93 \frac{K_H}{K_O} A_H \sqrt{\frac{\rho_H}{\rho_O}}$$

$$K_H \cong K_O, \quad A_O \cong 8 A_H \sqrt{\frac{\rho_H}{\rho_O}}$$

where $K_H$, $K_O$ are constants depending on the Reynolds number, feed tube size and the orifice diameter.

$\rho_H$, $\rho_O$ are the density of gaseous oxygen and hydrogen just upstream of the orifice.

When and as any imbalance occurs, the self-regulating character involved in the 1.075:1 storage volume ratio, the same storage gas pressure, and the fixed ratio orifices, and common pressure of the mixing chamber causes the supply of gas to mixing chamber 70 to deviate from stiochiometric proportions, in the direction of equilibrium. Self-regulation is, of course, advantageous, if only because no mechanical and electrical control appurtenance need be included in the space craft.

From the foregoing description, it will be evident that numerous variations and modifications can be made in the present water electrolysis system without departure from the invention.

What is claimed is:

1. A propulsion system having thrust generation means comprising:
   (a) a compartmented electrolysis chamber having separate storage compartments for hydrogen and oxygen gas and adapted to contain a liquid electrolyte;
   (b) vent openings disposed below the top surface level of the electrolyte and joining both compartments;
   (c) an anode disposed in the oxygen storage compartment and a cathode disposed in the hydrogen storage compartment, said anode and cathode being located below the top surface level of the electrolyte; and
   (d) means for supplying oxygen gas from the oxygen storage compartment to said thrust generation means and hydrogen gas from said hydrogen storage compartment to said thrust generation means, said supply means including:
      (1) an oxygen supply line leading from said oxygen storage compartment to said thrust generation means;
      (2) a hydrogen supply line leading from said hydrogen storage compartment to said thrust generation means; and;
      (3) a fixed orifice plate in each supply line regulating the flow of propellant gas to said thrust generation means; whereby said compartmented electrolysis chamber and said supply means tend to passively maintain a stoichiometric ratio of hydrogen and oxygen gas at said thrust generation means.

2. The system of claim 1, wherein the volumetric ratio of hydrogen storage space to oxygen storage space in the electrolysis chamber is approximately 1.075:1.

3. The system of claim 1 wherein the volumetric ratio of volume in the hydrogen supply line to the volume in the oxygen supply line is approximately 1.075:1.

4. The system of claim 3 wherein the each fixed orifice plate has a predetermined ratio of orifice area which is a function of the density of the gaseous oxygen and hydrogen upstream of each orifice.

References Cited

UNITED STATES PATENTS

| | | | |
|---|---|---|---|
| 558,176 | 4/1896 | Huber | 204—278 |
| 2,098,629 | 11/1937 | Knowlton | 60—203 |
| 2,990,775 | 7/1961 | Henson | 60—200 |
| 3,262,872 | 7/1966 | Rhodes | 60—203 |

MARK NEWMAN, Primary Examiner

D. HART, Assistant Examiner

U.S. Cl. X.R,

60—39.12; 204—278